United States Patent
Masson et al.

(10) Patent No.: US 6,675,851 B1
(45) Date of Patent: Jan. 13, 2004

(54) RUBBER BASED PRODUCT, METHOD FOR PRODUCING SAME AND METHOD FOR REDUCING ROLLING RESISTANCE OF A TIRE MADE OF SAID PRODUCT

(75) Inventors: Francois Masson, Clermont-Ferrand (FR); Francis Renault, Clermont-Ferrand (FR)

(73) Assignee: Michelin & Cie, Clermont-Ferrand Cedex (FR)

( * ) Notice: Subject to any disclaimer, the term of this patent is extended or adjusted under 35 U.S.C. 154(b) by 0 days.

(21) Appl. No.: 09/568,172

(22) Filed: May 9, 2000

Related U.S. Application Data

(63) Continuation of application No. PCT/EP98/07111, filed on Nov. 6, 1998.

(30) Foreign Application Priority Data

Nov. 10, 1997  (FR) ............................. 97 14216

(51) Int. Cl.[7] ............... B60C 1/00; B60C 9/18
(52) U.S. Cl. ............. 152/564; 152/537; 152/510; 152/525; 524/394; 524/398
(58) Field of Search ............... 152/510, 525, 152/537, 547, 564, 565; 524/394, 398, 399, 400

(56) References Cited

U.S. PATENT DOCUMENTS

| | | | |
|---|---|---|---|
| 3,324,100 A | | 6/1967 | Kraus .................. 525/370 |
| 4,168,244 A | * | 9/1979 | Throckmorton ........... 502/117 |
| 4,383,005 A | * | 5/1983 | Weil et al. ............... 152/565 |
| 5,194,478 A | * | 3/1993 | Frandsen et al. ....... 252/186.33 |
| 5,387,368 A | * | 2/1995 | Nishimura et al. ..... 252/188.28 |

FOREIGN PATENT DOCUMENTS

| | | |
|---|---|---|
| EP | A0507207 | 10/1992 |
| EP | 0864606 * | 9/1998 |
| JP | 09151276 * | 6/1997 |

OTHER PUBLICATIONS

Chemical Abstracts, vol. 107, No. 20, Nov. 16, 1987, Columbus, Ohio; Abstract No. 177749, Satoru et al.: "Effect of Metal Complexes on Adhesion of Rubber ane Brass," XP002098984 & Nippon Setchaku Kyokaishi, vol. 23, No. 7, 1987, pp. 265–270.

Chemical Abstracts, vol. 82, No. 8, Feb. 24, 1975, Columbus, Ohio; Abstract No. 44700, XP002098983 & JP 49 004300 B (Sumitomo Chemical), Jan. 31, 1974.

* cited by examiner

Primary Examiner—Michael W. Ball
Assistant Examiner—Justin Fischer
(74) Attorney, Agent, or Firm—Baker Botts L.L.P.

(57) ABSTRACT

The present invention relates to a rubber-based product, having at least one buffer zone to trap oxygen external to said product in order to protect at least one sensitive zone of said product from oxidation, said buffer zone comprising a composition containing at least one elastomer and at least one iron (III) salt selected from iron (III) acetylacetonate and an iron (III) salt of a carboxylic acid having the formula $Fe(C_nH_{2n}O_2)_3$ in which $n$ is between 13 and 23.

This product is produced by incorporating, by mechanical working, said iron (III) salt into the composition in order to obtain said buffer zone. The buffer zone composition is advantageously used in a tire and imparts improved rolling resistance.

15 Claims, No Drawings

RUBBER BASED PRODUCT, METHOD FOR PRODUCING SAME AND METHOD FOR REDUCING ROLLING RESISTANCE OF A TIRE MADE OF SAID PRODUCT

This is a continuation divisional continuation-in-part of application Ser. No. PCT/EP98/07111 filed Nov. 6, 1998.

BACKGROUND

The present invention relates to a rubber-based product, a method for producing the product and to a method for reducing the rolling resistance of a tire formed from said product.

One of the main concerns of tire manufacturers is to increase the life of tires. In particular, it is important to increase endurance, with regard to oxidation of the rubber compositions, the metal or textile reinforcements and the interfaces between the rubber compositions and these reinforcements in tires.

One known process for reducing such oxidation phenomena involves restricting the quantity of oxygen, which arrives in a zone of the tire which is particularly sensitive to oxidation, whether in the inflation air or the outside air. Thus, a butyl rubber layer, which is impermeable to oxygen, has, for a long time, been used against the inner wall of tires by manufacturers. Unfortunately, the butyl rubber is not totally oxygen-impermeable, and cannot prevent oxidation of the tire even from reduced oxygen flow during long term use.

Other materials which are more airtight than butyl rubber have been proposed to reduce tire oxidation as described, for example, in U.S. Pat. No. 5,236,030, U.S. Pat. No. 4,874, 670, U.S. Pat. No. 5, 036,113, EP-A-337 279, U.S. Pat. No. 5,040,583 and U.S. Pat. No. 5,156,921. However, these materials are expensive and their use in tires causes many problems.

Another process for avoiding the problems of oxidation involves chemically trapping the oxygen by accelerated thermo-oxidation of a rubber composition which acts as a buffer, arranged between a main oxygen source and the zone which it is desired to protect from oxidation. By way of example, such a buffer composition may be located between the inner face of the tire, which may possibly be covered with butyl rubber, and the carcass ply, in order to reduce the quantity of oxygen which comes into contact with this ply from the inflation air. Such an arrangement is seen, in particular, in tires intended to be mounted on heavy vehicles. In order to accelerate the fixing of the oxygen, these buffer compositions comprise a metal salt which catalyzes oxidation, in particular a cobalt salt. The effect of this salt is to activate homolytic decomposition of the hydroperbxides produced upon aging resulting from the afore-mentioned oxidation phenomena. The metal salt is preferably introduced in an amount of 0.2 to 0.3 parts by weight ("phr") in equivalent of cobalt to 100 parts by weight of the elastomer in the buffer composition. The amount of oxygen which can be trapped by this buffer composition is increased by about 50 to 100%, compared to the same composition without cobalt salt. Unfortunately, however, this improvement with regard to oxidation has been shown to be accompanied by a major increase in hysteresis losses of the buffer composition resulting from the significant quantity of cobalt salt introduced in the elastomer. This increase in hysteresis losses results, first, in an undesired self-heating of the composition, which results in a shortened life. Second, there is an undesired increase in the rolling resistance, which is contrary to the aim of tire manufacturers to restrict rolling resistance as far as possible in order to reduce fuel consumption.

For these reasons, the use of buffer compositions, no matter how attractive, has not been developed as much as expected.

European Patent application EP-A-507 207 describes a method for trapping oxygen by means of a buffer elastomeric composition, which is contained in a layer of a package. This buffer composition is in particular characterized by the presence of a transition metal salt designed to activate oxygen fixation. As above mentioned, the metal salts that are preferably described therein are cobalt salts. Other metals such as manganese or even iron are contemplated, but not in relation to specified salts.

SUMMARY

The present invention is based on the unexpected finding that the above described disadvantages can be greatly reduced by using specific iron salts, instead of cobalt salts, in antioxidation buffer compositions, to produce a rubber-based product for use in tires. The buffer compositions comprising such iron salts are used to provide a buffer zone to trap the oxygen external to said product in order to protect at least one sensitive zone of the rubber based product from oxidation. The buffer compositions comprise a composition containing at least one elastomer which comprises at least one iron (III) salt intended to activate the oxidation in said composition. More precisely, the elastomer composition comprises an iron salt selected from iron (III) acetylacetonate and an iron (III) salt of a carboxylic acid having the formula

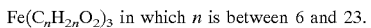
$Fe(C_nH_{2n}O_2)_3$ in which $n$ is between 6 and 23.

Iron (III) salts of carboxylic acids which correspond to this formula include salts of hexanoic, 2-ethylhexanoic, lauric, tridecanoic, myristic, pentadecanoic, palmitic, heptadecanoic, stearic, nonadecanoic, eicosanoic, heneicosanoic, docosanoic and tricosanoic acids. Preferred salts include iron (III) acetylacetonate, iron (III) hexanoate, iron (III) 2-ethylhexanoate, or iron (III) laurate.

According to a further embodiment of the invention, the iron salt is an iron (III) salt of a fatty acid having the formula

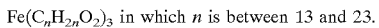
$Fe(C_nH_{2n}O_2)_3$ in which $n$ is between 13 and 23.

Preferably, said iron (III) salt is iron (III) stearate or iron (III) palmitate.

Preferably, the quantity of the iron (III) compound in the composition comprises from 0.01 to 0.02 phr of equivalent in iron, wherein "phr" means parts by weight of iron (or other metal) equivalent to 100 parts by weight of the elastomer or of all the elastomers present in the composition.

DETAILED DESCRIPTION

The composition according to the invention is based on natural or synthetic rubber, or a blend of two or more of these rubbers. Synthetic rubbers capable of being used in the composition according to the invention include diene rubbers such as polyisoprene, polybutadiene, mono-olefinic rubbers such as polychloroprene, polyisobutylene, styrene-butadiene or styrene-butadiene-isoprene copolymers, acrylonitrile-butadiene-styrene copolymers and ethylene-propylene-diene/terpolymers.

Preferred synthetic rubbers include the diene rubbers, in particular any homopolymer obtained by polymerization of a conjugated diene monomer having 4 to 12 carbon atoms, any copolymer obtained by copolymerization of one or more conjugated dienes with one another or with one or more vinyl aromatic compounds having 8 to 20 carbon atoms.

Suitable conjugated dienes are, in particular, 1,3-butadiene, 2-methyl-1,3-butadiene, the 2,3-di($C_1$ to $C_5$ alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl aromatic compounds are, in particular, styrene, ortho-, meta-and para-methylstyrene, the commercial mixture "vinyl-toluene", para-tertiobutylstyrene, the methoxy-styrenes, the chloro-styrenes, vinyl mesitylene, divinyl benzene and vinyl naphthalene.

The copolymers comprise between 99% and 20% by weight of diene units and between 1% and 80% by weight of vinyl aromatic units. The elastomers may have any microstructure, which is a function of the polymerization conditions used, in particular of the presence or absence of a modifying and/or randomizing agent and the quantities of modifying and/or randomizing agent used. The elastomers may, for example, be block, statistical, sequenced or microsequenced elastomers, and may be prepared in dispersion or in solution.

Preferred synthetic diene rubbers are polybutadienes, particularly those having a 1,2 bond content of between 4% and 80% and those having a content of cis-1,4 bonds of more than 90%, polyisoprenes; butadiene-styrene copolymers, and in particular those having a styrene content of between 5% and 50% by weight and, more particularly, between 20% and 40% by weight, a 1,2 bond content of the butadiene part of between 4% and 65%, and a content of trans-1,4 bonds of between 30% and 80%; those having a total content of aromatic compounds of between 5% and 50% by weight and a glass transition temperature (Tg) of 0° C. to –80° C., and in particular those having a styrene content of between 25 and 35% by weight, a vinyl bond content of the butadiene part of between 55% and 65%, a content of trans 1,4 bonds of between 20 and 25%, and a Tg of between –20° C. and –30° C.

In the case of butadiene-styrene-isoprene copolymers, suitable polymers include those having a styrene content of between 5% and 50% and, more particularly, between 10% and 40%, an isoprene content of between 15% and 60% by weight, and more particularly between 20% and 50%, a butadiene content of between 5% and 50% by weight, and more particularly between 20% and 40%, a 1,2 bond content of the butadiene part of between 4% and 85%, a content of trans-1,4 bonds of the butadiene part of between 6% and 80%, a content of 1,2 plus 3,4 bonds of the isoprene part of between 5% and 70%, and a content of trans-1,4 bonds of the isoprene part of between 10% and 50%.

The synthetic rubbers may be coupled and/or starred or alternatively functionalized with a coupling and/or starring or functionalizing agent. The rubbers may be vulcanized and/or reticulated by any known agents including, inter alia, sulphur, peroxides, and bis-maleimides.

The composition according to the invention comprises conventional fillers and additives, including, inter alia, carbon black, silica, stearic acid, reinforcing resins, silicic acid, zinc oxide, activators, pigments, vulcanization accelerators or retarding agents, anti-ageing agents, anti-reversion agents, antioxidants, oils or various working agents, tackifying resins, adhesion promoters to metal, antioxidant waxes, bonding agents and/or covering agents for silica.

The compositions according to the invention may be used in a very wide variety of applications and for numerous rubber products, in particular, tires, as buffer compositions between an oxygen source, in particular the inflation air or external air, and a zone to be protected in the tire. For example, these compositions can be used within the inner rubber, between the inner rubber and the carcass ply, between the carcass ply and the crown plies, between the crown plies and the tread, between the carcass ply and the sidewall, or even on the outside of the sidewall.

The iron salts according to the invention are used very differently from the known uses of iron compounds in the rubber industry, such as, for example, the known use of oxidizing salts to promote mastication of rubbers (peptizing properties) or devulcanization for recycling, such as described, for example, in U.S. Pat. No. 3,324,100, EP-A-157 079 and RU-A-2 014 339.

The method for producing a rubber-based product according to the present invention, involves incorporating, by mechanical working, said iron (III) salt in to the elastomer or elastomers in the composition, in order to produce the buffer zone composition.

In a further embodiment of the invention, the iron (III) salt is incorporated into the elastomer composition at the same time as a filler intended to reinforce the composition.

The present invention also provides a method for reducing the rolling resistance of a tire by incorporating by mechanical working an iron (III) salt as defined above into the one or more elastomers used in a composition forming the tire.

The invention will be readily understood with the aid of the following non-limiting examples.

These examples are either examples in accordance with the invention or examples which are not in accordance with the invention. In the latter case, the compositions comprise either no metallic compound or they comprise cobalt salts or iron compounds not included in the group of iron (III) salts according to the invention.

The effectiveness of the iron or cobalt compounds to activate oxidation in the composition was evaluated by subjecting the compositions to thermo-oxidizing aging. The oxygen uptake was measured by elemental analysis and the evolution of mechanical properties of the compositions, such as the modulus, the hysteresis loss and the breaking properties, was determined.

The tests were carried out under the following conditions:

Vulcanization

Unless indicated otherwise, all the tests were carried out on samples that had been vulcanized by curing for 10 minutes at 150° C.

Aging Caused by Thermo-oxidation

A ventilated oven at temperatures of 65° C. and 85° C. was used. These temperatures were considered as representative of the temperature range during the operation of tires.

Hysteresis Losses

Hysteresis losses, or hysteresis (HL) are a loss of energy measured at 60° C. by rebound at the sixth impact relative to energy supplied. The value, expressed in %, is the difference between the energy supplied and the energy restored, relative to the energy supplied. The deformnation for the losses measured was 40%.

Tensile Tests

The moduli of elongation at 10% elongation (M10) and 100% elongation (M 100) were measured in accordance with ISO Standard 37.

Scott Break Indices

The breaking stresses (Bs) were also measured in secant moduli (MPa) and the elongations at break (Eb) in %. All these tensile measurements were effected under normal conditions of temperature and hygrometry in accordance with ISO Standard 37.

THE EXAMPLES

In the following examples, the following base composition was used, which was produced by known techniques in an internal mixer and then on an external mixer, all the figures. given being parts by weight. The iron (III) salt was introduced into the internal mixer, for example a Banburry, at the same time as the carbon black, ZnO, the stearic acid and the 6PPD.

| | |
|---|---|
| Natural rubber | 100 |
| Carbon black N326 | 47 |
| Sulphur | 4.5 |
| DCBS | 0.8 |
| ZnO | 7.5 |
| Stearic acid | 0.9 |
| 6PPD | 1.5 |

DCBS: N,N-dicyclohexyl-2-benzothiazole sulphenamide
6PPD: N-1,3-dimethylbutyl-N'-phenyl-paraphenylenediamine Starting with this base composition, the following compositions were prepared:
Control Compositions:
  Composition T1: base composition without metal derivative.
  Composition T2: base composition comprising cobalt naphthenate in an amount of 0.25 phr, in equivalent cobalt.
  Composition T3: base composition comprising iron (III) fumarate in an amount of 0.25 phr, in equivalent of iron.
  Composition T4: base composition comprising iron (III) gluconate in an amount of 0.25 phr, in equivalent of iron.
  Composition T5: base composition comprising iron (III) citrate in an amount of 0.25 phr, in equivalent of iron.
Compositions According to the Invention:
  Composition I1: base composition comprising ferric acetylacetonate in an amount of 0.02 phr, in equivalent of iron.
  Composition I2: base composition comprising ferric stearate in an amount of 0.01 phr, in equivalent of iron.
  Composition I3: base composition comprising ferric 2-ethylhexanoate in an amount of 0.02 phr, in equivalent of iron.
  Composition I4: base composition comprising ferric laurate in an amount of 0.02 phr, in equivalent of iron.
  Composition I5: base composition comprising ferric palmitate in an amount of 0.02 phr, in equivalent of iron.
  Composition I6: base composition comprising ferric hexanoate in an amount of 0.02 phr, in equivalent of iron.

Example 1

With these compositions, the moduli of elongation M10 and M100 and hysteresis losses (or hysteresis) were determined. The results are given in Table 1 below.

TABLE 1

| | T1 | T2 | I1 | I2 | I3 | I4 | I5 | I6 |
|---|---|---|---|---|---|---|---|---|
| M10 (MPa) | 5.1 | 6.0 | 5.0 | 4.9 | 4.2 | 4.3 | 4.4 | 4.5 |
| M100 (MPa) | 4.6 | 4.7 | 4.4 | 4.4 | 4.2 | 4.3 | 4.3 | 4.5 |
| HL (%) | 16.5 | 20.0 | 16.0 | 17.0 | 16. | 16 | 15.7 | 15 |

Table 1 shows that the iron (III) salt, in the compositions according to the invention: modified the characteristics of the base composition less than the cobalt compound. Moreover, the hysteresis loss was significantly higher for the control composition T2 containing the cobalt compound than the invention compositions.

Example 2

The object of this example was to demonstrate the suitability of compositions I1, I2, I3, I4, I5, I6 according to the invention to fix oxygen, after a thermo-oxidation period of 10 weeks at 65° C. or 2 weeks at 85° C., in comparison to control compositions T1 and T2.

The results of these thermo-oxidation tests are shown in Table 2 below, which gives the % in weight of fixed oxygen by each composition at each thermo-oxidation temperature.

TABLE 2

| | T1 | T2 | I1 | I2 | I3 | I4 | I5 | I6 |
|---|---|---|---|---|---|---|---|---|
| At 65° C. | 0.7 | 1.3 | 1.6 | 1.1 | 0.9 | 0.8 | 0.8 | 0.9 |
| At 85° C. | 1.2 | 2.0 | 2.2 | 1.9 | 1.9 | 1.7 | 1.8 | 1.7 |

Table 2 shows that the compositions according to the invention fix oxygen in amounts similar to that obtained with the cobalt-containing control composition (T2). Oxygen fixation was significantly greater in T2 and the invention compositions than in the control composition without iron or cobalt compound (T1).

Base compositions containing metal salts, such as manganese II or III salts and in particular manganese (II) carbonate, acetate or acetylacetonate, manganese (III) acetylacetonate, molybdenum (IV) salts and in particular molybdenum (IV) sulphide and oxide, copper (II) salts and in particular copper (II) hydroxide, carbonate, stearate, acetate or acetylacetonate, chromium (III) salts and in particular chromium acetylacetonate, cerium (IV) sulfate, that have been described in the literature as pro-oxidizing, when introduced in a quantity such that there is an isomolar quantity of metal relative to the control composition T2, produce results similar to those obtained with the control composition T1 (without metal salt), that is to say, a percent by weight of fixed oxygen from 1.0 to 1.3 at 85° C.

Example 3

The object of this example was to study the moduli and the breaking properties, and the hysteresis losses of the compositions I1, I3, I4, I5, I6 according to the invention in comparison with the control composition T2 containing the cobalt compound, following the thermo-oxidation treatment described in Example 2.

The results are given in Tables 3 and 4 below, which show, for each composition, the evolution of the values of the different parameters relative to those of the same composition before thermo-oxidization. Table 3 gives the evolution for the treatment at 65 ° C. and Table 4 n gives the evolution for the treatment at 85° C.

TABLE 3

|      | T2    | I1    | I3    | I4    | I5    | I6    |
|------|-------|-------|-------|-------|-------|-------|
| M10  | 60%   | 50%   | 65%   | 62%   | 58%   | 58%   |
| M100 | +100% | +110% | +125% | +110% | +110% | +106% |
| HL   | +7    | +6    | 3.2   | +3.6  | +3.7  | +3.5  |
| Eb   | −65%  | −70%  | −64%  | −66%  | −61%  | −55%  |
| Bs   | −55%  | −60%  | −47%  | −52%  | −46%  | −41%  |

TABLE 4

|      | T2    | I1    | I3    | I4    | I5    | I6    |
|------|-------|-------|-------|-------|-------|-------|
| M10  | +70%  | +95%  | +62%  | +46%  | +53%  | +54%  |
| M100 |       | values not measurable | | | | |
| HL   | +10   | +8    | +5.9  | +4.1  | +6.1  | +7.1  |
| Eb   | −85%  | −90%  | −84%  | −82%  | −82%  | −80%  |
| Bs   | −80%  | −85%  | −79%  | −76%  | −77%  | −73%  |

Tables 3 and 4 show that the evolution was generally of the same order of magnitude for the composition according to the invention (I1) and for the known composition (T2), but that the hysteresis loss of the compositions according to the invention was improved compared with that of the control T2.

Example 4

This example is the same as Example 3, with the difference that composition I2 according to the invention was compared to control composition T2. The results are given in Tables 5 (treatment at 65° C.) and 6 (treatment at 85° C.).

TABLE 5

|      | T2    | I2    |
|------|-------|-------|
| M10  | +50%  | +60%  |
| M100 | +90%  | +100% |
| HL   | +8    | +5    |
| Eb   | −70%  | −60%  |
| Bs   | −60%  | −40%  |

TABLE 6

|      | T2    | I2    |
|------|-------|-------|
| M10  | +65%  | +60%  |
| M100 | values not measurable | |
| HL   | +10   | +7    |
| Eb   | −85%  | −85%  |
| Bs   | −80%  | −80%  |

The conclusions drawn from this example are the same as for Example 3.

Example 5

The object of this example was to study the quantity of oxygen fixed in iron compound-containing compositions not in accordance with the invention.

Oxygen fixation tests were carried out under the same conditions as in Example 2 on the control compositions T1 to T5. The results are shown in Table 7 below, which can be compared to the results in Table 2.

TABLE 7

|          | T1  | T2  | T3  | T4  | T5  |
|----------|-----|-----|-----|-----|-----|
| At 65° C.| 0.7 | 1.3 | 0.8 | 0.8 | 0.8 |
| At 85° C.| 1.0 | 1.8 | 1.0 | 1.0 | 1.0 |

It should be noted that the iron compound-containing control compositions T3 to T5, which are not in accordance with the invention, have a capability to fix oxygen which is less than that of the cobalt-containing control composition T2 and of the same level as the composition T1 without metal salt.

Example 6

The object of this comparative example was to demonstrate the advantage of using a composition according to the invention in a tire.

Identical tires for heavy vehicles, each of dimension 315/80 R22.5, were produced, comprising, in known manner, from the inside to the outside:

a layer of rubber which defines the inner cavity of the tire ("inner rubber") intended to contain the pressurized air, this layer being of low permeability to air to limit the exit of air to the rest of the tire;

a buffer composition of rubber intended to trap the oxygen coming from the inner cavity;

a carcass ply;

a crown reinforcement; and a tread.

The base formulation of the preceding examples was used for the buffer composition, except that carbon black N772 was used instead of carbon black N326. It was then vulcanized.

Starting from this base composition, the following compositions were produced:

Control composition T6: base composition comprising cobalt naphthenate in an amount of 0.25 phr, in equivalent of cobalt.

Composition according to the invention I3: base composition comprising ferric acetylacetonate in an amount of 0.02 phr, in equivalent of iron.

These compositions were vulcanized as known and the moduli of elongation M10, M100 and the hysteresis losses were determined.

The results are given in Table 8.

TABLE 8

|           | T6   | I3   |
|-----------|------|------|
| M10 (MPa) | 3.75 | 3.72 |
| M100 (MPa)| 3.60 | 3.74 |
| HL(%)     | 9.5  | 6.0  |

As indicated previously, the invention makes it possible substantially to reduce go the hysteresis losses.

Three control tires containing the composition T6 and three tires comprising the composition I3 according to the invention were produced. The rolling resistance of all these tires was evaluated by subjecting them to the test described in ISO Standard 9948. The following results (expressed in kg/ton) are the averages of the three measurements for each category of tire:

| Tires with T6 | Tires with I3 |
|---|---|
| 5.15 | 5.07 |

It is therefore noted that composition I3 according to the invention makes it possible substantially to reduce the rolling resistance of the tires.

In summary, the invention makes it possible to:

considerably reduce the metal content in the rubber composition, while maintaining substantially the same oxygen-fixing characteristics;

significantly reduce the hysteresis losses of the rubber compositions resulting, in particular, in the reduction in rolling resistance of the tires and improved endurance.

Of course, the invention is not limited to the examples previously described.

What is claimed is:

1. A tire comprising, from the inside to the outside, an inner layer of rubber defining the inner cavity of the tire, a carcass ply, crown plies and a tread, at least one intermediate layer of rubber being provided between the inner layer and the carcass ply and/or between the carcass ply and the crown plies and/or between the crown plies and the tread, wherein said intermediate layer comprises a rubber composition intended to trap oxygen that comprises at least one iron (III) salt which is designed to activate oxidation in said composition and which is selected from iron (III) acetylacetonate and an iron (III) salt of a carboxylic acid having the formula $Fe(C_nH_{2n}O_2)_3$ in which n is between 6 and 23.

2. A tire according to claim 1, wherein the salt is iron (III) acetylacetonate.

3. A tire according to claim 1, wherein the salt is an iron (III) salt of a fatty acid having the formula $Fe(C_nH_{2n}O_2)_3$, in which n is between 6 and 23.

4. A tire according to claim 3, wherein the salt is an iron (III) salt of a fatty acid having the formula $Fe(C_nH_{2n}O_2)_3$, in which n is between 13 and 23.

5. A tire according to claims 3, wherein the salt is iron (III) hexanoate.

6. A tire according to claim 3, wherein the salt is iron (III) 2-ethylhexanoate.

7. A tire according to claim 3, wherein the salt is iron (III) laurate.

8. A tire according to claim 3, wherein the salt is iron (III) stearate.

9. A tire according to claim 3, wherein the salt is iron (III) palmitate.

10. A tire according to claim 1 or 2, wherein said composition comprises natural rubber or synthetic polyisoprene.

11. A tire according to claim 1, wherein said intermediate layer of rubber is provided between the inner layer and the carcass ply.

12. A tire according to claim 11, wherein said tire is a heavy vehicle tire.

13. A method for making a tire comprising, from the inside to the outside, an inner layer of rubber defining the inner cavity of the tire, a carcass ply, crown plies and a tread, at least one intermediate layer of rubber being provided between the inner layer and the carcass ply and/or between the carcass ply and the crown plies and/or between the crown plies and the tread, said intermediate layer comprising a rubber composition intended to trap oxygen that comprises from 0.01 to 0.02 phr in equivalent iron at least one iron (III) salt which is designed to activate oxidation in said composition and which is selected from iron (III) acetylacetonate and an iron (III) salt of a carboxylic acid having the formula $Fe(C_nH_{2n}O_2)_3$ in which n is between 6 and 23, the method comprising incorporating, by mechanical working, said salt into said composition.

14. A method for making a tire according to claims 12, further comprising incorporating a reinforcing filler into said composition at the same time as the iron (III) salt.

15. A method for reducing the rolling resistance of a tire comprising, from the inside to the outside, an inner layer of rubber defining the inner cavity of the tire, a carcass ply, crown plies and a tread, at least one intermediate layer of rubber being provided between the inner layer and the carcass ply and/or between the carcass ply and the crown plies and/or between the crown plies and the tread, said intermediate layer comprising a rubber composition intended to trap oxygen, the method comprising incorporating into said composition, by mechanical working, from 0.01 to 0.02 phr in equivalent iron of at least one iron (III) salt which is designed to activate oxidation in said composition and which is selected from iron (III) acetylacetonate and an iron (III) salt of a carboxylic acid having the formula $Fe(C_nH_{2n}O_2)_3$ in which n is between 6 and 23.

\* \* \* \* \*

UNITED STATES PATENT AND TRADEMARK OFFICE
CERTIFICATE OF CORRECTION

PATENT NO. : 6,675,851 B1
DATED : January 13, 2004
INVENTOR(S) : Masson et al.

It is certified that error appears in the above-identified patent and that said Letters Patent is hereby corrected as shown below:

Column 1,
Line 6, "divisional continuation-in-part" should read -- continuation --
Line 52, "hydroperbxides" should read -- hydroperoxides --

Column 4,
Line 61, "deformnation" should read -- deformation --
Line 66, "(M 100)" should read -- (M100) --

Column 5,
Line 13, "figures." should read -- figures --

Column 6,
Line 66, "n" should be deleted

Column 9,
Line 28, "comprises at" should read -- comprises from 0.01 to 0.02 phr in equivalent of iron at --

Signed and Sealed this

Eighth Day of June, 2004

JON W. DUDAS
*Acting Director of the United States Patent and Trademark Office*